Aug. 13, 1963  F. WOODRUFF  3,100,497
TWO-WAY VALVE
Filed March 28, 1960

INVENTOR
FRANK WOODRUFF

BY Robert W. Ely
ATTORNEY

United States Patent Office 3,100,497
Patented Aug. 13, 1963

3,100,497
TWO-WAY VALVE
Frank Woodruff, Utica, N.Y., assignor to The Bendix Corporation, a corporation of Delaware
Filed Mar. 28, 1960, Ser. No. 17,927
8 Claims. (Cl. 137—119)

This invention relates to valves having an axially-slidable valve element and more particularly concerns such valves having a construction whereby, by axial movement of a pressure-actuated valve element, a gas or other fluid is diverted from one flow path to another flow path.

An object of the present invention is to provide an improved two-way valve having an axially-slidable latched valve element which is quickly moved by the pressure of fluid and is reliable under conditions of high temperature, high pressure and entrainment of solids.

A further object is to provide such an improved valve in which a tubular latched control element alternately connects to surrounding flow chambers and blocks the opening of an axially-extending latch recess to prevent entry of solid particles.

Another object is the provision of improved valve having axially-slidable valving means operable by the pressurized fluid being controlled and latching means released by axial movement of lock means whereby a minimal external force is required.

An additional object is to provide an improved valve having such valving means and latching means wherein these means automatically reset to normal position after moving to diverting position.

Another object is the provision of an improved two-way valve having an axially-movable tubular control element for surrounding chambers and resilient latching fingers connected to the control element and arranged to be unlocked by an axial plunger and to be released by the pressure force on the control element.

A further object is the provision of a two-way valve having pressure-actuated, latched tubular control means and lock means which are axially-movable in a valve body whereby a compact easily-assembled construction results.

Figure 1:
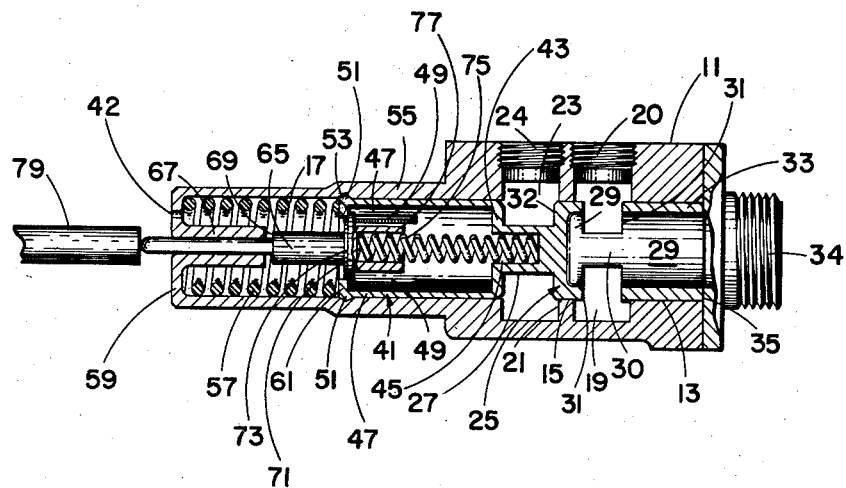
Figure 2:
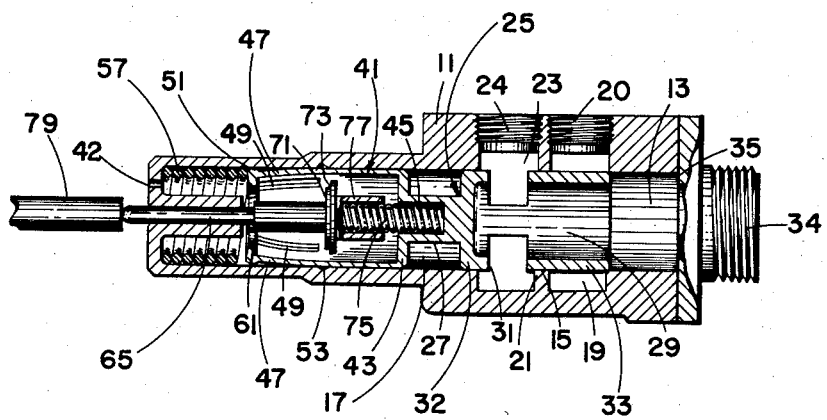

The realization of the above objects along with the features and advantages of the invention will be apparent from the following description and the accompanying drawing in which:

FIG. 1 is a longitudinal cross-sectional view of an embodiment of the invention and shows the valve control element latched and locked against pressure forces and providing a first flow path and FIG. 2 is a longitudinal cross-sectional view of the valve of FIG. 1 and shows the valve control element unlatched and moved axially by pressure forces to provide blocking of the first flow path and diverting to a second flow path.

Referring to FIG. 1, the valve body 11 is formed at the right with an inlet valve guide bore 13 and has axially-aligned therewith a centrally-located guide opening 15 and a cylindrical latch recess 77 at the left. A nozzle or first chamber 19 having outlet 20 is at the right of the transverse chamber-separating wall 21 having guide opening 15 while an exhaust chamber 23 having outlet 24 is at the left. Bore 13, opening 15 and recess 17 have the same diameter whereby tubular control means 25 can be slidably mounted and easily assembled in body 11 through bore 13. The larger-diameter chambers 19 and 23 surround the tubular control means 25 and extend radially-outwardly from recess 17, opening 15 and bore 13. The control means 25 has a neck 27 and extending to the right therefrom a cup-like valving projection or valve element 29. The tubular side wall 30 of valve element 29 has two diametrically-located ports 31 which permit gas to flow from the interior of the cup-like valve element to the surrounding nozzle chamber 19. Since closely-fitted in guide opening 15, the transverse wall 32 of valve element 29 prevents flow to chamber 23. The cylindrical end 33 of the tubular side wall 30 of valve element 29 abuts the inner end of tubular inlet structure 34 which is suitably attached to body 11 and provides a passage or flow path to the interior of the valve element 29. The inner end of inlet structure 34 provides an annular stop or positioning shoulder 35 when valve element 29 moves to the right. Stop shoulder 35 limits the rightward return movement of control means 25 which is caused by an arrangement to be described and provides for aligning ports 31 with nozzle chamber 19.

The exteriorly-threaded inlet structure 34 is adapted to be connected to gas-producing cartridge means. The interiorly-threaded nozzle chamber outlet 20 and exhaust outlet 24 are respectively adapted to be connected to the nozzles and the exhaust duct of a turbine starter. With such connections, it is apparent that, after ports 31 have provided flow for starting and then are transversely aligned with exhaust chamber 23 by moving valve element 29 to the left (as will be described), excess cartridge gases will be blocked from the nozzle chamber 19 by the tubular end 33 and will flow through ports 31 into exhaust chamber 23. In this diverting position, the transverse wall 32 will be in recess 17 and thus seals off the recess 17 from the cartridge gases which have entrained particles. When control means 25 is in the normal flow position as shown in FIG. 1, it is apparent that the high pressure cartridge gases exert a relatively large force on transverse wall 32 of valve element 29 which would cause leftward movement of the valve element 29 unless restrained by a latch-lock arrangement which will now be described.

The control means 25 is latched in the position shown in FIG. 1 by having tubular latch means 41 slidably mounted in the right half of latch recess 17 which has an atmospheric vent 42. Latch device 41 is connected by its annular radial wall 43 and the neck 27 which has a spring recess 45 to valve element 29. Latch means 41 includes four axially-extending fingers 47 which are separated by axial slots 49 and are made of resilient spring steel. It is to be noted that wall 43 closes off recess 17 from residual solid particles in exhaust chamber 23 when the valve is in normal position. Each of the equi-spaced fingers 47 has a V-shaped outwardly-extending projection 51 which fits into a V-shaped annular groove 53 (hundred-and-twenty-degree included angle) in the side wall 55 of the latch recess 17. It is apparent that resilient fingers 47 can contract inwardly and slide axially from groove 53 when a predetermined axial force is applied to the right end of the control means 25.

A return coil spring 57 is confined between the end wall 59 of latch recess and the ends or inwardly-extending flat tabs 61 of fingers 47. Spring 57 surrounds a locking plunger 65 which extends through end wall 59 having a boss 67 for guiding and supporting the plunger 65. Plunger 65 is constructed to provide releasible lock means for the latch device 41. In order to restrain inward flexing of fingers 47, plunger 65 has a radially-outwardly-extending lock flange 71 which has an annular ledge 73 receiving the inner ends of finger tabs 61. A small-diameter plunger coil spring 75 is confined by plunger cup 77 and recess 45 in neck 43. Spring 75 urges the plunger to the left with a small force so that flange ledge 73 (which faces the end wall) is maintained in engagement with tabs 61 to prevent inward movement until the plunger 65 is moved slightly to the right by actuator rod 79. Rod 79 contacts plunger 65 and is part of a speed responsive device (not shown) connected to a turbine starter and is actuated at a predetermined speed of the turbine. The shoulder 69 of plunger 65, by abutting the closely-spaced end of boss 67, can limit the outward movement of plunger 65 if it is desired to use an actuator which is spaced to the left from the end of the plunger 65 as limited by boss 67.

In FIG. 2, the two-way valve of the present invention is shown in the diverting or exhausting position after the plunger 65 has been moved to the right to release fingers 47 and control means 25 has been moved to the left by the fluid pressure force so that ports 31 are aligned with exhaust chamber 23. Wall 32 seals off the latch recess 17, as mentioned. The leftward movement is limited by the full compression of spring 57 which thus constitutes stop means for positioning the control means 25 in diverting position. Fingers 47 are deflected inwardly after release from groove 53. For unlocking fingers 47, the actuating rod 79 has momentarily moved to the right sufficiently so that tabs 61 just clear ledge 73 or, stated differently, means are provided for moving plunger 65 a distance slightly greater than the depth of ledge 73 so that tabs 61 can move radially-inwardly. Rod 79 and plunger 65 will quickly return to the positioning shown in FIG. 1 since the turbine speed will rapidly decrease and reset the speed responsive device. With this positioning before return movement, the almost fully-compressed spring 75 will expand slightly so that relocking is facilitated. In the FIG. 2 diverting position, the tubular end 33 of valve element 29 blocks flow to nozzle chamber 19 so that excess cartridge gases are not able to drive a turbine starter or other device connected to outlet 20.

In operation, the two-way valve is positioned as shown in FIG. 1 so that high pressure gases from a cartridge are directed through the interior of tubular valve element 29 and ports 31 to nozzle chamber 19 and outlet 20 which is adapted to be connected to nozzles for a turbine starter. When it is required to divert flow from the nozzles as when the turbine starter attains a predetermined speed, the plunger 65 is moved a limited extent (as shown in FIG. 2) to the right by an external force, such as derived from actuator rod 79 of a speed responsive device, slightly compressing plunger spring 75. This movement is sufficient so that tabs 61 of the latch fingers 47 are unlocked and are free to move inwardly. Resilient fingers 47 are urged inwardly due to the force resulting from the pressurized gases acting on transverse wall 32 and urging control means 25 to the left and the inclination of the V-shaped projections 51 which engaged the mating V-shaped groove 53. Control means 25 is then free to move axially since the latch device 41 is unlocked and released, control means 25 is moved quickly to the left by the force produced by the pressurized gases on wall 32, with projections 51 sliding on side wall 55. The snap-action leftward movement continues until stopped by full compression of return spring 57 at which time openings 31 in valve element 29 are aligned with the exhaust chamber 23 and the transverse wall 32 of valve element 29 seals off latch recess 17 as shown in FIG. 2. The tubular end part 33 of valve element 29 now blocks flow to the nozzle chamber 19. Thus, flow is diverted from the nozzle chamber 19 and is provided to the exhaust chamber 23 which is adapted to be connected to an exhaust duct whereby excess cartridge gases can be prevented from powering a turbine. Rod 79 and plunger 65 will be positioned as shown in FIG. 1 shortly after gases are diverted to exhaust since the turbine speed rapidly decreases to reset the speed responsive device.

When the pressure of the gases is sufficiently reduced to a predetermined level (about atmospheric as the cartridge burns out), return spring 57 and plunger spring 75 expand forcing control means 25 to the right as limited by stop shoulder 35 for FIG. 1 positioning. In moving to the right, tabs 61 contact plunger flange 71 so that plunger 65 is moved slightly compressing spring 75. Return spring 57 thus urges the plunger 65 sufficiently to the right so that V-shaped projections 51 on resilient fingers 47 engage the V-shaped groove 53 and then the axial wall of the ledge 73 enters the opening formed by the inner ends of tabs 61. Thus, the fingers 47 are again restrained from radially-inward movement by ledge 73 and control means 25 is automatically relatched to the valve body 11 and relocked whereby the cycle can be repeated. It is to be noted that the external force required to operate the valve is minimal since plunger 65 is easily moved and then a large force from the pressurized fluid to be diverted actuates the valve.

It is to be understood that persons skilled in the art can make changes in the disclosed embodiment without departing from the invention as set forth in the appended claims.

What is claimed is:

1. A two-way valve comprised of a cup-like valve element; said valve element having a transverse wall and a tubular side wall extending from said transverse wall; valve body means providing successively in axial alignment an inlet passage connected to the interior of said valve element, a guide bore receiving the end of said tubular wall, and first and second chambers surrounding the tubular wall of said valve element; a wall separating said chambers and having a guide opening slidably receiving said valve element; the side wall of said valve element having ports connecting the interior thereof to said first chamber; a neck extending axially from the transverse wall of said valve element; an axially-movable latch device connected to said neck for positioning said valve element; lock means arranged to lock and to release said latch device; said valve element being movable by pressurized fluid when said latch device is released so that said latch device is unlatched and said ports connect to said second chamber and said side wall blocks flow to said first chamber.

2. A two-way valve comprised of a cup-like valve element; said valve element having a transverse wall and a tubular side wall extending from said transverse wall; valve body means providing successively in axial alignment an inlet passage connected to the interior of said valve element, a guide bore receiving the end of said tubular wall, and first and second chambers surrounding the tubular wall of said valve element; a wall separating said chambers and having a guide opening slidably receiving said valve element; the side wall of said valve element having ports connecting the interior thereof to said first chamber; a neck extending axially from the transverse wall of said valve element; an axially-movable latch device connected to said neck for positioning said valve element; lock means arranged to lock and to release said latch device; said valve element being movable by pressurized fluid when said latch device is released so that said latch device is unlatched and said ports connect to said second chamber and said side wall blocks flow to said first chamber; said valve body means having a latch recess opening into said second chamber; said latch device being mounted in said latch recess and having a radial wall connected to said neck and arranged to close off said recess; said transverse wall of said valve element being constructed to seal off said latch recess when valve element is moved so that said ports connect to said second chamber.

3. A two-way valve comprised of a cup-like valve element; said valve element having a transverse wall and a tubular side wall extending from said transverse wall; valve body means providing successively in axial alignment an inlet passage connected to the interior of said valve element, a guide bore receiving the end of said tubular wall, and first and second chambers surrounding the tubular wall of said valve element; a wall separating said chambers and having a guide opening slidably receiving said valve element; the side wall of said valve element having ports connecting the interior thereof to said first chamber; a neck extending axially from the transverse wall of said valve element; an axially-movable latch device connected to said neck for positioning said valve element; lock means arranged to lock and to release said latch device; said valve element being movable by pressurized fluid when said latch device is released so that said latch device is unlatched and said ports connect to said second chamber and said side wall blocks flow to said first chamber; said latch device being arranged to relatch and to return said valve element so that the flow path to said first chamber is established when the pressure of the fluid decreases below a predetermined level; said lock means being arranged to relock automatically said latch device when relatched.

4. A two-way valve comprised of a cup-like valve element; said valve element having a transverse wall and a tubular side wall extending from said transverse wall; valve body means providing successively in axial alignment an inlet passage connected to the interior of said valve element, a guide bore receiving the end of said tubular wall, first and second chambers surrounding the tubular wall of said valve element and a cylindrical latch recess; a wall separating said chambers and having a guide opening slidably receiving said valve element; the side wall of said valve element having ports connecting the interior thereof to said first chamber; a neck extending axially from the transverse wall of said valve element; a spring-biased axially-movable tubular latch device mounted in said latch recess and connected to said neck; lock means within said tubular latch device arranged to lock and to release said latch device; said valve element and said spring-biased latch device being movable by pressurized fluid when said latch device is released so that said latch device is unlatched and said ports connect to said second chamber and said side wall blocks flow to said first chamber; said spring-biased latch device being arranged to relatch and to return said valve element so that the flow path to said first chamber is established when the pressure of the fluid decreases below a predetermined level; said lock means being arranged to relock automatically said latch device when relatched; said valve body means providing an annular stop shoulder at the outer end of said guide bore, the end of said tubular wall of said valve element abutting said stop shoulder when said ports are connected to said first chamber.

5. A latched, pressure-actuated valve comprised of body means having an inlet and an outlet, valving means, said body means and said valving means being arranged and normally positioned so that a flow path is formed connecting said inlet and said outlet, said valving means being constructed to slide axially to a diverting position for blocking flow to said outlet, said body means having an end wall and a tubular side wall providing a cylindrical latch recess, latching means slidably mounted in said recess and being connected to said valving means, said tubular side wall having a V-shaped groove, said latching means having resilient latch fingers with V-shaped projections engaging said groove to maintain normal positioning of said valving means, said latch fingers being movable radially-inwardly to disengage from said groove and having radially-inwardly-extending tabs, said valving means being constructed so that the force from pressurized fluid in said flow path will tend to disengage and to urge said latching means into said latch recess, a plunger axially-mounted in said end wall and extending into said latch recess, said plunger having a lock flange with a ledge engaging said tabs arranged to prevent radially-inwardly-movement and disengagement of said latch structure, said plunger being movable in said latch recess to release said lock flange whereby said latch means disengages and moves into said recess and said valving means moves to said diverting position when subject to pressurized fluid, spring means biasing said latch means and said plunger so that said valving means returns to its normal position and so that said projections engage said groove and said lock flange ledge engages said tabs when the valving means is not subject to pressurized fluid.

6. A two-way valve comprised of a valve body means having axially-arranged a cylindrical latch recess, an exhaust chamber, a circular guide opening, a nozzle chamber, and an inlet valve guide bore; said guide opening and said valve guide bore having the same diameter; said exhaust chamber and said nozzle chamber extending radially-outwardly from said guide opening and said valve guide bore; said valve body means having an inlet passage connected to said valve guide bore; control means having a tubular latch device slidably mounted in said latch recess and a cup-like valve element slidably mounted in said guide opening and said valve guide bore; said cup-like valving element blocking said guide opening and having ports connecting to said nozzle chamber; said tubular latch device having a radially-inwardly-extending wall adjacent said exhaust chamber; said control means having a neck connecting said radial wall of said latch device and said cup-like valve element; said latch device having a plurality of axially-extending resilient latch fingers; each of said latch fingers having a V-shaped radially-outwardly-extending projection and a flat tab extending radially-inwardly; said valve body means having an end wall and a side wall providing said latch recess; said V-shaped projections being received in an annular V-shaped groove in the side wall of said latch recess; a plunger extending through said latch recess end wall and having a radial lock flange; said lock flange having an annular tab ledge; said tabs of said latch fingers being mounted on said ledge whereby radially-inward movement of said tabs and disengagement of said V-shaped projections from said V-shaped groove is prevented; said plunger being axially-movable so that said ledge will clear said tabs whereby said tabs are released and said fingers can move radially-inwardly; said cup-like valve element being so constructed that, when said plunger releases said tabs, the force on said valve element derived from fluid at a predetermined pressure will cause disengagement of said fingers from said V-shaped groove and said valve element will be moved to block flow to said nozzle chamber and to provide flow to said exhaust chamber.

7. A two-way valve comprised of a valve body means having axially-arranged a cylindrical latch recess, an exhaust chamber, a circular guide opening, a nozzle chamber, and an inlet valve guide bore; said guide opening and said valve guide bore having the same diameter; said exhaust chamber and said nozzle chamber extending radially-outwardly from said guide opening and said valve guide bore; said valve body means having an inlet passage connected to said valve guide bore and providing an annular shoulder at the outer end of said valve guide bore; control means having a tubular latch device slidably mounted in said latch recess and a cup-like valve element slidably mounted in said guide opening and said valve guide bore and abutting said shoulder; said cup-like valving element having a transverse wall blocking said guide opening and having ports connecting to said nozzle chamber; said tubular latch device having a radially-inwardly-extending wall adjacent said exhaust chamber for closing said latch recess; said control means having a neck connecting said radial wall of said latch device and said cup-like valve element; said latch device having a plurality of axially-extending resilient latch fingers; each of said latch fingers having a V-shaped radially-outwardly-extending projection and a flat tab extending radially-inwardly; said valve body means having an end wall and a side wall providing said latch recess; said V-shaped projections being received in an annular V-shaped groove in the side wall of said latch recess; a plunger extending through said latch recess end wall and having a radial lock flange; said lock flange having an annular tab ledge facing said end wall; said tabs of said latch fingers being mounted on said ledge whereby radially-inward movement of said tabs and disengagement of said V-shaped projections from said V-shaped groove is prevented; a return spring surrounding said plunger and extending between said end wall and said latch tabs; a plunger spring within said tubular latch device arranged to urge said plunger flange toward said end wall; said plunger being constructed so that it can be moved axially-inwardly and said ledge will clear said tabs whereby said tabs are released and said fingers can move radially-inwardly; said cup-like valve element and said return spring being so constructed that, when said plunger releases said tabs, the force on said valve element derived from fluid at a predetermined pressure will cause disengagement of said fingers from said V-shaped groove and said valve element will be moved to block flow to said nozzle chamber and to provide flow to said exhaust chamber; said return spring and said plunger spring being adapted to return said control means and said plunger to the original positioning when the fluid pressure on said projection is below said predetermined pressure.

8. A latched, pressure-actuated valve comprised of body means having an inlet and an outlet, said body means having an end wall and a tubular side wall providing a cylindrical latch recess, valving means, said body means and said valving means being arranged and normally positioned so that a flow path is formed connecting said inlet and said outlet, said valving means being constructed to move toward said latch recess to a diverting position for blocking flow to said outlet, latching means slidably mounted in said recess and being connected to said valving means, said tubular side wall having an annular V-shaped indentation, said latching means having resilient fingers, the ends of said fingers engaging said indentation to maintain normal positioning of said valving means, the ends of said fingers having inwardly-extending projections, said fingers being movable radially-inwardly to disengage said fingers from said indentation, said valving means being constructed so that the force from pressurized fluid in said flow path will tend to disengage said fingers and to urge said latching means into said latch recess, locking means extending through said end wall into said latch recess, said locking means having a thin disc structure contacting said finger projections to prevent radially-inwardly-movement and disengagement of said latch fingers, said locking means being movable into said latch recess so that said disc moves out of contact with said fingers and provides clearance for the flexing of said fingers whereby the latching means is quickly released and disengaged as the valving means moves to diverting position.

References Cited in the file of this patent

UNITED STATES PATENTS

| | | |
|---|---|---|
| 711,398 | Hanson | Oct. 14, 1902 |
| 2,586,691 | Mills | Feb. 19, 1952 |
| 2,701,116 | Roth | Feb. 1, 1955 |
| 2,877,795 | Cocklin | Mar. 17, 1959 |

FOREIGN PATENTS

| | | |
|---|---|---|
| 1,147,137 | France | June 3, 1957 |
| 71,585 | France | July 15, 1959 |
| | (First Addition to No. 1,147,137) | |